United States Patent
Musuvathy

(10) Patent No.: US 9,902,114 B2
(45) Date of Patent: Feb. 27, 2018

(54) METHOD FOR CREATING THREE DIMENSIONAL LATTICE STRUCTURES IN COMPUTER-AIDED DESIGN MODELS FOR ADDITIVE MANUFACTURING

(71) Applicant: Siemens Product Lifecycle Management Software Inc., Plano, TX (US)

(72) Inventor: Suraj Ravi Musuvathy, Glenmont, NY (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 484 days.

(21) Appl. No.: 14/591,320

(22) Filed: Jan. 7, 2015

(65) Prior Publication Data

US 2015/0193559 A1    Jul. 9, 2015

Related U.S. Application Data

(60) Provisional application No. 61/925,362, filed on Jan. 9, 2014, provisional application No. 61/948,157, filed on Mar. 5, 2014.

(51) Int. Cl.
*B29C 67/00* (2017.01)
*G06F 17/50* (2006.01)
(Continued)

(52) U.S. Cl.
CPC ........ *B29C 67/0088* (2013.01); *B29C 64/386* (2017.08); *G06F 17/5086* (2013.01);
(Continued)

(58) Field of Classification Search
None
See application file for complete search history.

(56) References Cited

U.S. PATENT DOCUMENTS

| | | | | |
|---|---|---|---|---|
| 4,831,953 | A | * | 5/1989 | Conrad ................ B63H 9/0657 114/102.31 |
| 7,577,547 | B2 | * | 8/2009 | Subramaniam ......... G06T 17/20 702/167 |

(Continued)

FOREIGN PATENT DOCUMENTS

| | | |
|---|---|---|
| JP | H05301293 A | 11/1993 |
| JP | 2011501251 A | 1/2011 |

(Continued)

OTHER PUBLICATIONS

Bern, M. and Eppstein, D. "Mesh generation and optimal triangulation." Computing in Euclidean geometry 1 (1992), pp. 23-90. (78 pages).

(Continued)

*Primary Examiner* — Omar F Fernandez Rivas
*Assistant Examiner* — Cuong Luu

(57) ABSTRACT

Methods for creating three dimensional lattice structures in computer-aided design models. A method includes receiving a solid model containing a plurality of boundary surfaces for a void region, computing a bounding box of the solid model and a plurality of grid points on an axis-aligned grid within the bounding box, creating a lattice cell layout for a lattice structure within the void region, computing an implicit model defined by a scalar value for each of the grid points on the axis-aligned grid, extracting the lattice structure in the solid model based on the implicit model.

20 Claims, 9 Drawing Sheets

(51) Int. Cl.
*B29C 64/386* (2017.01)
*B33Y 50/02* (2015.01)

(52) U.S. Cl.
CPC .............. *B33Y 50/02* (2014.12); *G06F 17/50* (2013.01); *G06F 17/5018* (2013.01); *G06F 2217/12* (2013.01)

(56) References Cited

U.S. PATENT DOCUMENTS

| | | | |
|---|---|---|---|
| 8,112,245 B2* | 2/2012 | Subramaniam | G06T 17/20 |
| | | | 702/167 |
| 8,789,317 B2* | 7/2014 | Cheh | E04B 1/32 |
| | | | 29/428 |
| 9,477,798 B1* | 10/2016 | Guoy | |
| 2005/0219245 A1* | 10/2005 | Tao | G06T 17/20 |
| | | | 345/424 |
| 2006/0066610 A1 | 3/2006 | Asano et al. | |
| 2006/0152507 A1 | 7/2006 | Lee et al. | |
| 2007/0132758 A1 | 6/2007 | Oh et al. | |
| 2010/0295849 A1 | 11/2010 | Chai et al. | |
| 2012/0010741 A1 | 1/2012 | Hull et al. | |
| 2015/0250259 A1* | 9/2015 | Attey | A43B 3/108 |
| | | | 36/103 |
| 2016/0024780 A1* | 1/2016 | Sevtsuk | E04B 1/32 |
| | | | 52/474 |

FOREIGN PATENT DOCUMENTS

| | | |
|---|---|---|
| KR | 20120110989 A | 10/2012 |
| KR | 1020120110989 A | 10/2012 |

OTHER PUBLICATIONS

Chen, Y. "3d texture mapping for rapid manufacturing." Computer-Aided Design & Applications vol. 4, 6 (2007), pp. 761-771. (10 pages).

Chen, Y. and Wang, C.C. "Regulating complex geometries using layered depth-normal images for rapid prototyping and manufacturing." Rapid Prototyping Journal vol. 19, 4 (2013), pp. 253-268. (27 pages).

Hussein, A., et al. "Advanced lattice support structures for metal additive manufacturing." Journal of Materials Processing Technology (2013), (8 pages.).

Jones, M.W., et al. "3d distance fields: A survey of techniques and applications." IEEE Transactions on Visualization and Computer Graphics, vol. 12, 4 (2006), pp. 581-599. (23 pages).

Lorensen, W.E., et al. "Marching cubes: A high resolution 3d surface construction algorithm." In ACM Siggraph Computer Graphics (1987), vol. 21, ACM, pp. 163-169. (13 pages).

Masood, S.H. and Alamara, K. "Development of scaffold building units and assembly for tissue engineering using fused deposition modelling." Advanced Materials Research vol. 83 (2010), 269-274. (6 pages).

Pasko, A., et al. "Procedural function-based modelling of volumetric microstructures." Graphical Models vol. 73, 5 (2011), 165-181. (19 pages).

Pasko, A., et al. "Procedural function-based spatial microstructures." In Shape Modeling International Conference (SMI), (2010), IEEE, pp. 47-56. (17 pages).

Sederberg, T.W., et al. "Watertight trimmed NURBS." In ACM Transactions on Graphics (TOG) (2008), vol. 27, ACM, 8 pages.

Strano, G., et al. "A new approach to the design and optimisation of support structures in additive manufacturing." The International Journal of Advanced Manufacturing Technology (2013), pp. 1-8. (9 pages).

Wang, H., et al. "A hybrid geometric modeling method for large scale conformal cellular structures." In ASME 7 Computers and Information in Engineering Conference, Long Beach, California (2005), 13 pages.

Wang, H., et al. "Parametric modeling method for truss structures," In ASME Computers and Information in Engineering Conference (2002), 9 pages.

Yan, C., et al. "Evaluations of cellular lattice structures manufactured using selective laser melting." International Journal of Machine Tools and Manufacture vol. 62 (2012), pp. 32-38. (7 pages).

Bendsoe, M.P. and Kikuchi, N. "Generating optimal topologies in structural design using a homogenization method." Computer Methods in Applied Mechanics and Engineering vol. 71, 2 (1988), pp. 197-224. (28 pages).

Challis, V.J. "A discrete level-set topology optimization code written in matlab." Structural and Multidisciplinary Optimization vol. 41, 3 (2010), 453-464. (12 pages).

Chu, C., et al. "Design for additive manufacturing of cellular structures." Computer-Aided Design and Applications vol. 5, 5 (2008), 686-696. (12 pages).

Rozvany, G.I.N. "A critical review of established methods of structural topology optimization." Structural and Multidisciplinary Optimization vol. 31, 3 (2009), pp. 217-237. (21 pages).

Sethian, J. A., and Wiegmann, A. "Structural boundary design via level set and immersed interface methods." Journal of Computational Physics vol. 163, 2 (2000), pp. 489-528. (38 pages).

Suzuki, K. and Kikuchi, N. "A homogenization method for shape and topology optimization." Computer Methods in Applied Mechanics and Engineering vol. 93, 3 (1991), pp. 291-318. (28 pages).

Wang, M.Y., et al. "A level set method for structural topology optimization." Computer Methods in Applied Mechanics and Engineering vol. 192, 1 (2003), pp. 227-246. (20 pages).

Wang, C.C.L. and Chen, Y. "Layered Depth-Normal Images: a Sparse Implicit Representation of Solid Models. Layered depth-normal images: A sparse implicit representation of solid models." arXiv preprint arXiv:1009.0794, Sep. 2010, 27 pages.

Stava, O., et al. "Stress relief: improving structural strength of 3d printable objects." ACM Transactions on Graphics (TOG), vol. 31(4), 2012, 11 pages.

PCT Search Report for application PCT/US2015/010685, dated Apr. 14, 2015, 11 pages.

EP Search Report dated Oct. 10, 2017, for EP Application No. 15734974.7, 21 pages.

Yoo, Dong J.: "Porous Scaffold Design Using the Distance Field and Triply Periodic Minimal Surface Models," Biomaterials, Elsevier Science Publishers BV., Barking, GB; vol. 32; No. 31; Jul. 7, 2011; XP028268192; ISSN: 0142-9612; Jul. 7, 2011, 14 pages.

Yoo, Dong-Jin: "General 3D Offsetting of a Triangular Net Using an Implicit Function and the Distance Fields," International Journal of Precision Engineering and Manufacturing; vol. 10; No. 4; XP055117411; ISSN: 1229-8557; Jan. 10, 2009, 12 pages.

Sanchez, Mathieu et al.: "Efficient Evaluation of Continuous Signed Distance to a Polygonal Mesh," Computer Graphics; ACM; 2 Penn Plaza; Suite 701; New York; NY 10121-0701; USA; XP058014007; ISBN: 978-1-4503-1977-5; / Feb. 5, 2012, 8 pages.

Chen, Yong: "3D Texture Mapping for Rapid Manufacturing," Computer-Aided Design and Appications; vol. 4, No. 6; XP055333091; / Jan. 1, 2007, 10 pages.

JP Office Action dated Oct. 2, 2017, for JP Application No. 2016-545775, 4 pages.

* cited by examiner

500

700

600

700

600

800

805

FIG. 9A
900
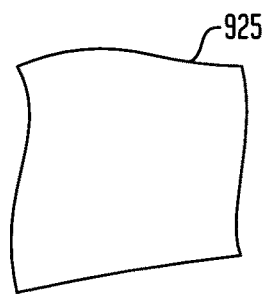
FIG. 9B
905
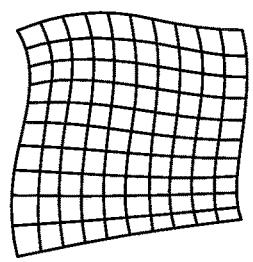
FIG. 9C
910
FIG. 9D
915
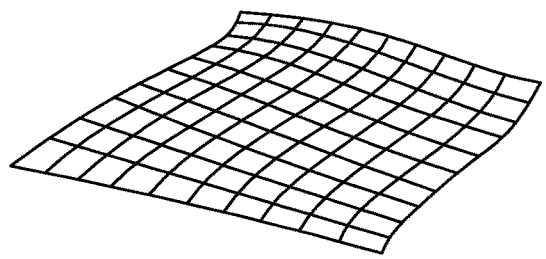
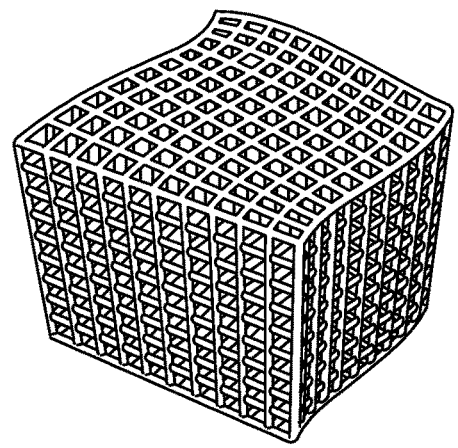
FIG. 9E
920
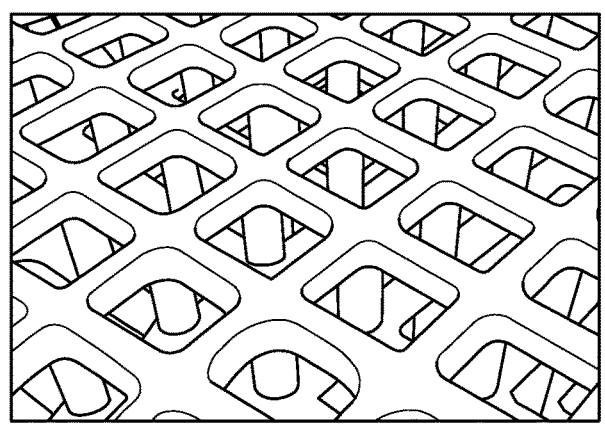

1200

1200

1400

METHOD FOR CREATING THREE DIMENSIONAL LATTICE STRUCTURES IN COMPUTER-AIDED DESIGN MODELS FOR ADDITIVE MANUFACTURING

CROSS-REFERENCE TO OTHER APPLICATION

This application claims the benefit of the filing date of U.S. Provisional Patent Application 61/925,362, filed Jan. 9, 2014, which is hereby incorporated by reference.

This application claims the benefit of the filing date of U.S. Provisional Patent Application 61/948,157, filed Mar. 5, 2014, which is hereby incorporated by reference.

This application shares some subject matter with commonly-assigned, concurrently filed U.S. patent application Ser. No. 14/591395 for "Method for Structure Preserving Topology Optimization of Lattice Structures for Additive Manufacturing", which is hereby incorporated by reference.

TECHNICAL FIELD

The present disclosure is directed, in general, to additive manufacturing and more particularly to a system and method for performing additive manufacturing using lattice models.

BACKGROUND OF THE DISCLOSURE

Additive manufacturing enables fabrication of products with complex internal lattice structures, which are repeated arrangements of shapes in a grid-like pattern or other pattern of repeated shapes that replace a solid volume. A lattified part is defined as a part where a portion of the volume has been replaced with an appropriate lattice that consists of a pattern of cell shapes.

SUMMARY OF THE DISCLOSURE

Various disclosed embodiments include methods for creating three dimensional lattice structures in computer-aided design models. A method includes receiving a solid model containing a plurality of boundary surfaces for a void region, computing a bounding box of the solid model and a plurality of grid points on an axis-aligned grid within the bounding box, creating a lattice cell layout for a lattice structure within the void region, computing an implicit model defined by a scalar value for each of the grid points on the axis-aligned grid, wherein the scalar value for each grid point is determined by: (i) calculating a surface distance based on a minimum distance for the grid point to the boundary surfaces; (ii) calculating a lattice distance based on the minimum distance for the grid point to the lattice structure; and (iii) setting the scalar value based on a lesser of the surface distance and the lattice distance; and extracting the lattice structure in the solid model based on the implicit model.

Various disclosed embodiments include a data processing system for creating three dimensional lattice structures in computer-aided design models. The data processing system includes a processor and an accessible memory. The data processing system particularly configured to receive a solid model containing a plurality of boundary surfaces for a void region, compute a bounding box of the solid model and a plurality of grid points on an axis-aligned grid within the bounding box, create a lattice cell layout for a lattice structure within the void region, compute an implicit model defined by a scalar value for each of the grid points on the axis-aligned grid, wherein the scalar value for each grid point is determined by: (i) calculate a surface distance based on a minimum distance for the grid point to the boundary surfaces; (ii) calculate a lattice distance based on the minimum distance for the grid point to the lattice structure; and (iii) set the scalar value based on a lesser of the surface distance and the lattice distance; and extract the lattice structure in the solid model based on the implicit model.

Various disclosed embodiments include non-transitory computer-readable mediums for creating three dimensional lattice structures in computer-aided design models. The non-transitory computer-readable medium encoded with executable instructions that, when executed, cause one or more data processing systems to receive a solid model containing a plurality of boundary surfaces for a void region, compute a bounding box of the solid model and a plurality of grid points on an axis-aligned grid within the bounding box, create a lattice cell layout for a lattice structure within the void region, compute an implicit model defined by a scalar value for each of the grid points on the axis-aligned grid, wherein the scalar value for each grid point is determined by: (i) calculate a surface distance based on a minimum distance for the grid point to the boundary surfaces; (ii) calculate a lattice distance based on the minimum distance for the grid point to the lattice structure; and (iii) set the scalar value based on a lesser of the surface distance and the lattice distance; and extract the lattice structure in the solid model based on the implicit model.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIGS. 9A-9E illustrate a lattice created by extending solid modeling concepts in accordance with disclose embodiments;

DETAILED DESCRIPTION

Figure 1:
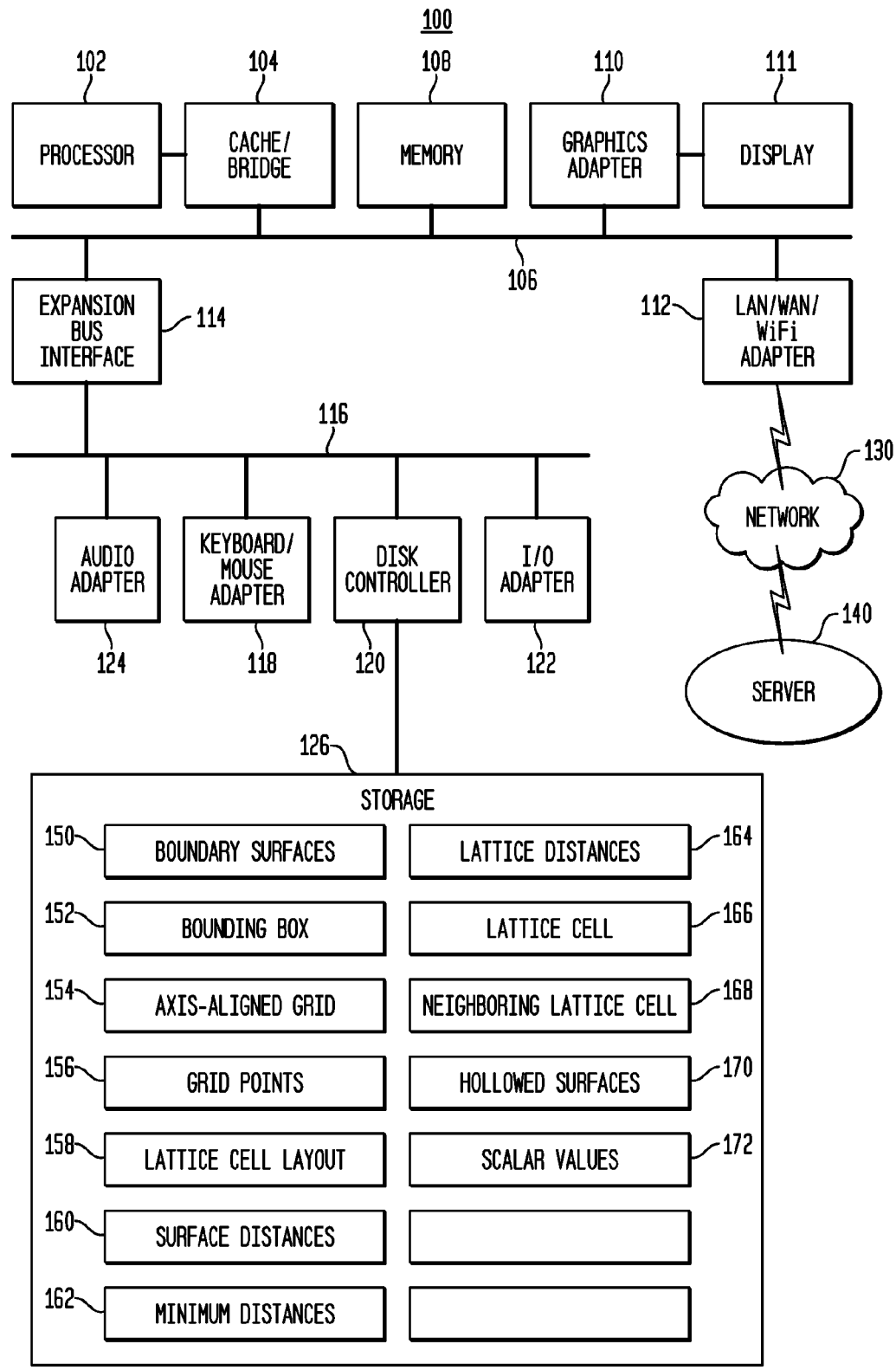
FIG. 1 illustrates a block diagram of a data processing system in which an embodiment can be implemented.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Disclosed is a method using implicit volumetric scalar field representations and processes for creating models with varying surface thickness and lattices. The input is a solid model in either boundary representation (Brep) CAD or polygonal mesh format. The bounding box of the solid model is computed and an axis-aligned grid covering the bounding box is created to compute an implicit volumetric scalar field representation of the region. The thickness of the surface is specified in order to create the hollow model. The thickness value can be variable across the surface of the model. A cell template is specified for application within the lattice model. The cell template shape is designed as a skeleton structured of connected line segments and an associated thickness that defines the 3D volume of the template as an offset of the skeleton. A lattice cell layout is created that defines the arrangement of the lattice cell template within the desired region, and this is not limited to the axis-aligned grid. At each point of the implicit volume grid, the distance to the surface is computed. The surface thickness at the computed closest surface point is subtracted from the distance value. The distance to the closest lattice cell shape is also computed using the transformed representation of the template skeleton and the scaled value of its associated thickness. The scaled thickness value is subtracted from the lattice cell distance. The minimum value of the two distances is then set as the scalar value at the corresponding volume point. From the implicit volume representation, the internal lattice structure surface is extracted as a polygonal mesh and post-processed to improve the shape. The internal surface is then combined with the outer surface of the solid model to fabricate the desired model with lattice structures.

By using implicit volume data representations and methods, the method enables a simple approach for complicated offsetting to create non-uniform thickness shells, and explicit surface-intersection based Booleans with lattice cells and the shell. The implicit-based offsetting method automatically addresses the situation when the solid model is thinner than the hollowing thickness specified. The method creates smoothly joined surfaces at lattice cell junctions as well as at the interface of the inner surface of the hollowed out shell model, thereby removing the need for applying post-Boolean edge blends. Smooth surfaces improve manufacturing output quality, avoid stress concentrations, and enhance product functionality and ergonomics.

Although the outer surface of the solid model typically has a high precision representation, the same level of accuracy may not be required for the internal geometry and therefore the method can increase computation speed by using a low resolution representation of the implicit functions.

Commercial computer-aided design (CAD) systems do not have sufficient support for creating lattice structures in a solid CAD model, and lattice modeling has typically used the existing functionality of commercial CAD systems, which is laborious, computationally demanding and error-prone. The disclosed method can be implemented with commercial CAD systems, without the need for new implicit representations, and creates user-friendly interactive applications for lattice modeling.

FIG. 1 illustrates a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. The storage 126 stores the boundary surfaces 150, the bounding box 152, the axis-aligned grid 154, the grid points 156, the lattice cell layout 158, the surface distances 160, the minimum distances 162, the lattice distance 164, the lattice cells 166, the neighboring lattice cells 168, the hollowed surfaces 170, scalar values 172, and so on, which are described below.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

FIGS. 2-4B illustrate examples of lattified parts in accordance with disclosed embodiments. Lattice structures can replace a region of an otherwise solid part, or reinforce an otherwise empty region of space in a complicated part.

Figure 2:
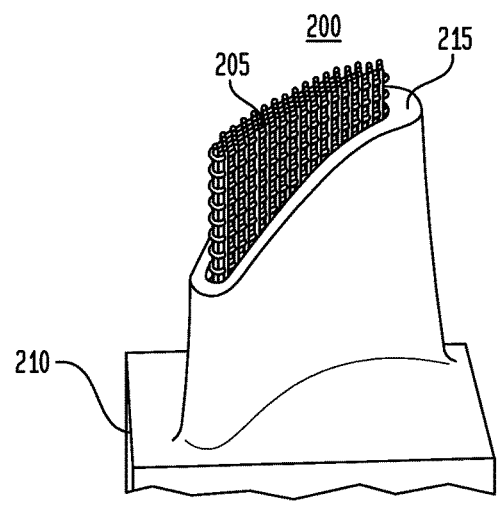
FIGS. 2-4B illustrate examples of lattified parts in accordance with disclosed embodiments.

FIG. 2 illustrates a cutaway view of a lattified part 200 in accordance with disclosed embodiments. The lattice structure 205 replaces a void region completely encased by the solid model 210. The void region is defined by the surface thickness 215 of the solid model 210.

Figure 3A:
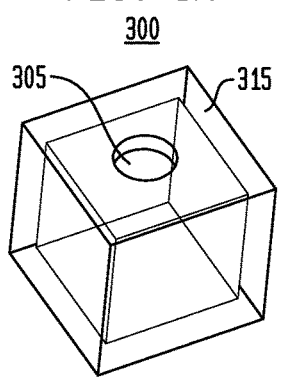
Figure 3B:
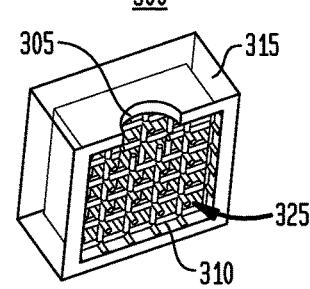

FIG. 3A illustrates a cube shaped shell 300 with an opening region 305 cutting the top region 315 of the shell 300 in accordance with disclosed embodiments. FIG. 3B illustrates a sectioned view of the cube shaped shell 300 with the opening region 305 including a lattice structure 310 created within the void region 325 that the shell 300 partly encloses in accordance with disclosed embodiments.

Figure 4A:
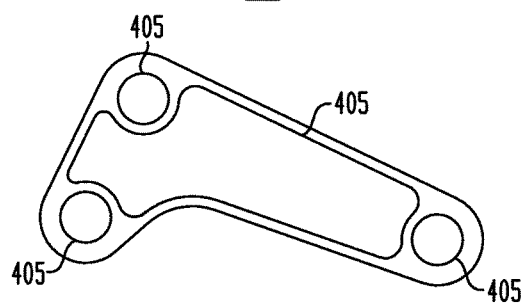
Figure 4B:
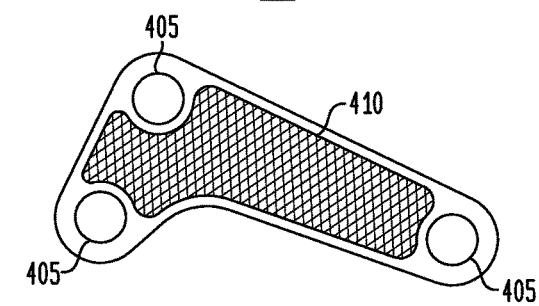

FIG. 4A illustrates a CAD part 400 with through holes 405 in accordance with disclosed embodiments. FIG. 4B illustrates the CAD part 400 with one of the through holes 405 reinforced with a lattice structure 410 in accordance with disclosed embodiments.

Lattified parts cannot be fabricated with other conventional manufacturing processes such as subtractive computer numerical control (CNC) or formative molding type processes. A primary need for lattices is motivated by the desire to create functional parts with high structural strength accompanied by low mass. Lattified parts can also provide enhanced energy absorption characteristics in order to dampen shocks or vibrations. For parts that are used in high temperature operating environments such as engines and turbines, lattices can provide enhanced internal cooling by possessing an increased effective surface area available for heat transfer. Lattified parts provide other advantages realized through raw material and manufacture time savings as there is lesser material to deposit, and as a result savings in energy utilization of manufacturing machines. Lighter moving parts require less driving physical forces and torques, therefore, consuming less energy during operation resulting in more sustainable and green product designs. Lattices can also be used to optimize the additive manufacturing process itself through optimal support structure designs.

Disclosed embodiments for creating lattices decouple the notion of lattice layout design with lattice surface extraction. The lattice layout design is the arrangement of lattice cells within a region of space. The lattice surface extraction is the creation of the boundary between the lattice material and air. Volumetric mesh representations and processes are used for designing lattice layouts, and discrete sampled implicit representations are used for representing the lattice surface.

Figure 5:
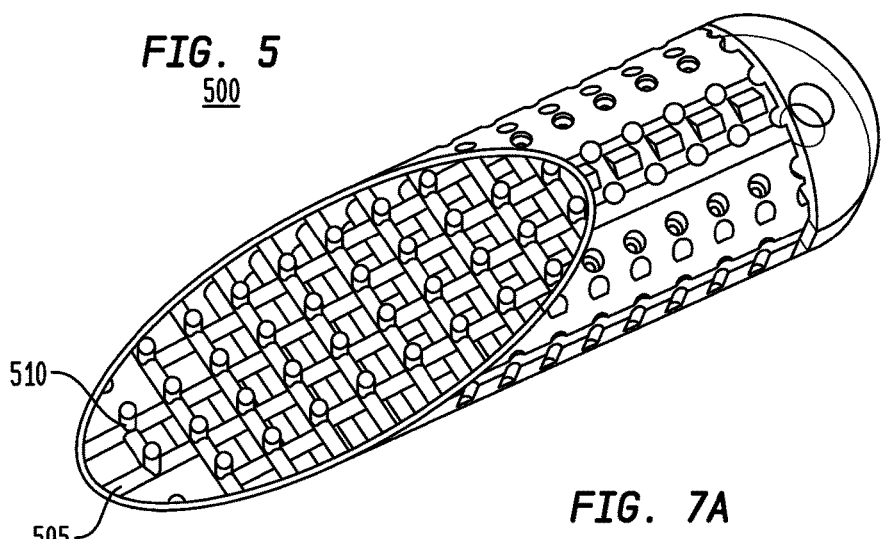
FIG. 5 illustrates a rod lattice in accordance with disclosed embodiments.

FIG. 5 illustrates a rod lattice 500 in accordance with disclosed embodiments. The layout generation can be performed by volumetric meshing using tetrahedral, hexahedral or any other type of volumetric element. The edges of the resulting volume mesh are treated as the rods 505 of the rod lattice 500. CAE analysis such as finite element analysis (FEA) can be performed efficiently using the rod or beam one dimensional (1D) element representation. The lattice surface 510 can be defined as an offset off the edges, with constant or varying thicknesses.

Figure 6A:
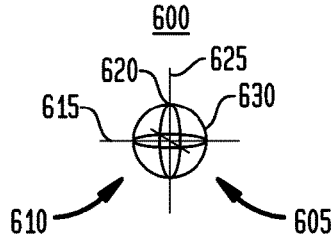
FIGS. 6A and 6B illustrate a user defined lattice template in accordance with disclosed embodiments.
Figure 6B:
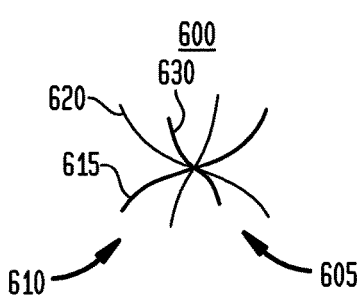

FIGS. 6A and 6B illustrate a user defined lattice template 600 in accordance with disclosed embodiments. The lattice templates 600 are lattice skeletons 605 created for maximizing the properties of the object. Each lattice template 600 is created within a unit cube 610, including edges 615 and vertexes 620. The lattice template 600 can be defined by line 625 and curve 630 segments. This enables 1D element CAE analysis as in the case of rod lattices. The lattice template 600 can also be defined with any of the available modeling tools in a CAD system, creating flexibility in the creation of lattice templates 600.

Figure 7A:
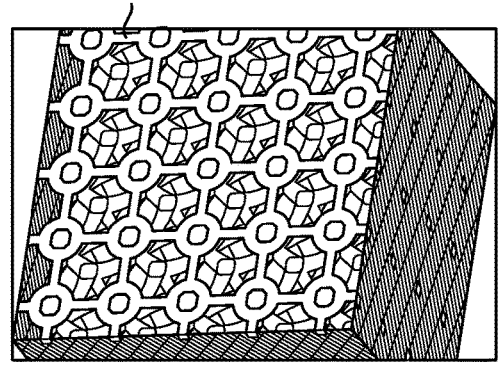
FIGS. 7A and 7B illustrate lattice structures with the lattice template applied at the lattice cells in accordance with disclosed embodiments.
Figure 7B:
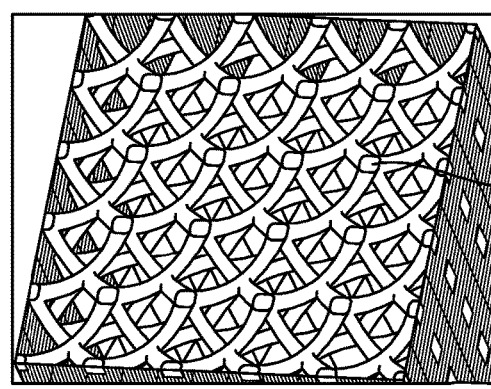

FIGS. 7A and 7B illustrate lattice structures 700 with the lattice template applied at the lattice cells 166 in accordance with disclosed embodiments. The layout generation is performed with hexahedral elements, and a lattice template is defined within a lattice cell 166. Each of the hexahedral elements is replaced with a transformed template lattice skeleton. The lattice surface is then an offset, lattice thickness 705, from the template skeleton within each lattice cell 166. The minimum distance 162 from each grid point 156 is measured to the lattice skeleton and the thickness is subtracted for calculation of the implicit scalar lattice value. When the grid point 156 is located on a vertex or edge of the lattice cell 166, the minimum distance 162 to the lattice skeletons of the neighboring lattice cells 168 are also measured.

Figure 8A:
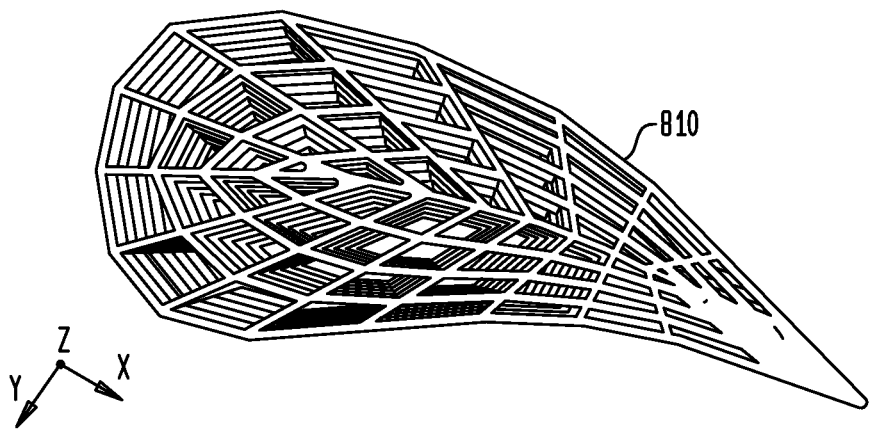
FIGS. 8A and 8B illustrate conformal lattices in accordance with disclosed embodiments.
Figure 8B:
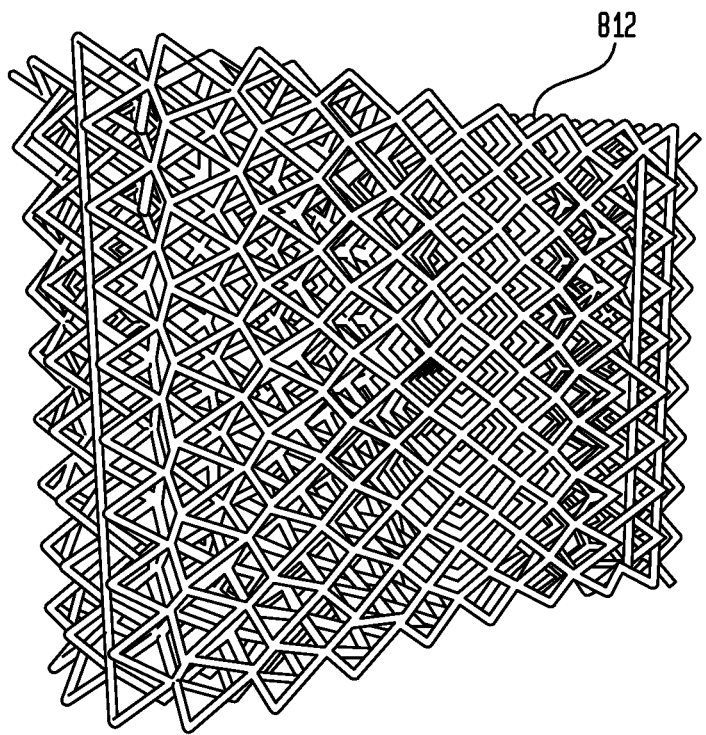

FIGS. 8A and 8B illustrate conformal lattices in accordance with disclosed embodiments. FIG. 8A illustrates a conformal lattice 800 where the lattice structure conforms to the irregular boundary surfaces 810. FIG. 8B illustrates a conformal lattice 805 where the lattice structure incorporates a user defined lattice template 812.

FIGS. 9A-9E illustrate a lattice created by extending solid modeling concepts in accordance with disclose embodiments. FIG. 9A illustrates a 2D sketch 900 with freeform curves 925. FIG. 9B illustrates a 2D lattice design 905 based on the geometry of the 2D sketch 900. FIG. 9C illustrates a 3D lattice design 910 based on the 2D lattice design 905. FIG. 9D illustrates a 3D lattice 915 extruded using solid modeling operations. FIG. 9E illustrates a sampled implicit representation 920 of the lattice surface. The sampled implicit representation 920 can be converted to a voxel representation and combined with a suitable finite element mesh of the part for FEA, greatly simplifying the challenging problem of computing volumetric meshes for lattices and enables application of commercial solvers. Sampled implicit representations 920 can be used for complex lattice templates in place of 1D elements.

The sampled implicit representation 920 can be used directly create manufacturing instructions by performing slicing on the implicit representations and combining with manufacturing instructions for the rest of the part. Polygonal facet mesh representations may be extracted from the implicit representations for visualization and manufacturing. The junctions of lattice cells are blended smoothly through implicit function blending processes therefore avoid complex computationally-intensive and error-prone B-rep type surface filleting and blending. The trimming of the lattice to retain only a certain subsection can be achieved easily through implicit Booleans, which are straightforward to compute. Mass properties, such as volume, center of gravity, etc., can be computed on the implicit representation 920 to calculate accurate mass properties of the part. Different lattice templates can be blended together to create innovative lattice designs.

Figure 10:
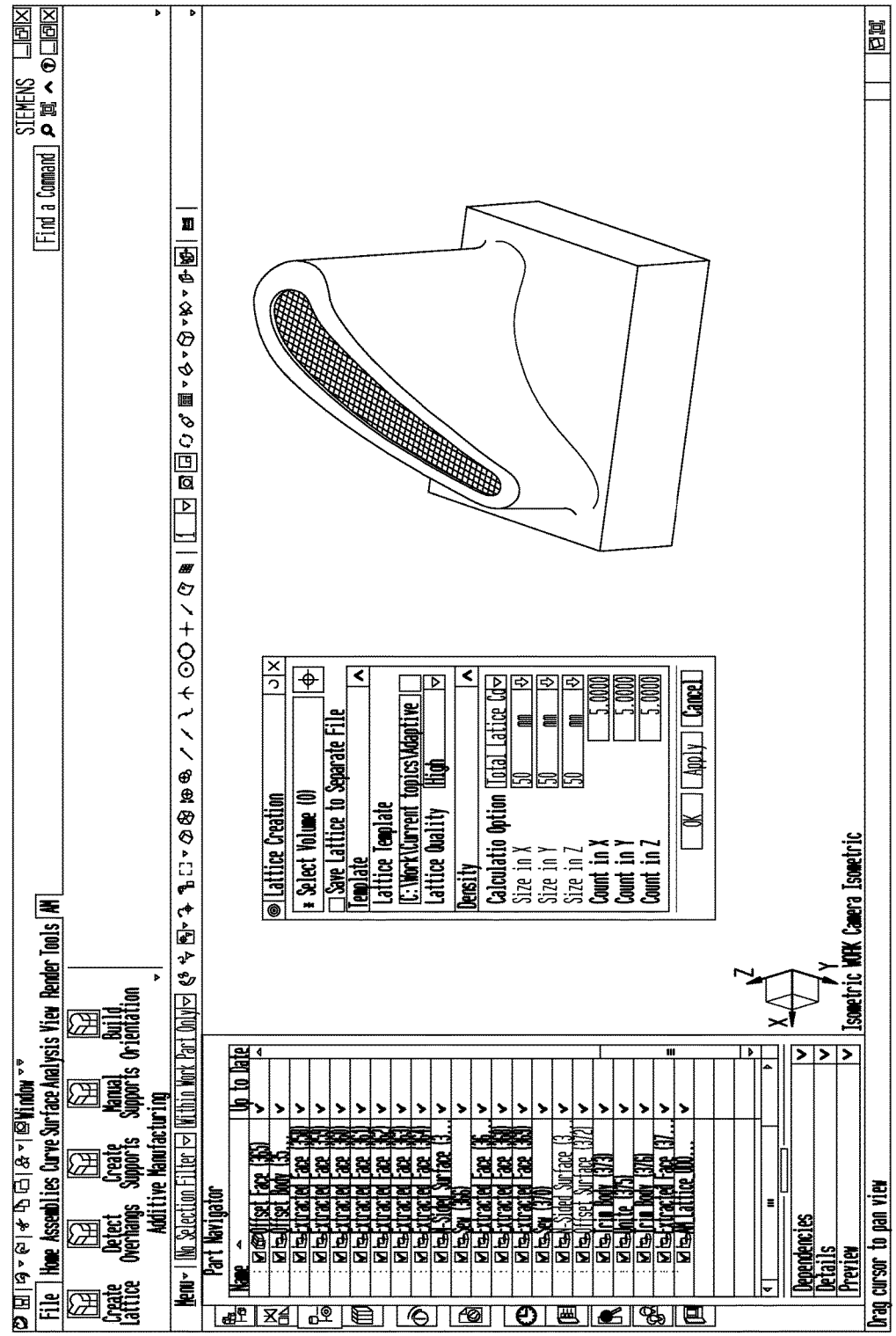
FIG. 10 illustrates creation of lattice structures within an computer-aided system (CAD/CAM/CAE) in accordance with disclosed embodiments.

FIG. 10 illustrates creation of lattice structures within a computer-aided system 1000 (CAD/CAM/CAE) in accordance with disclosed embodiments. The computer-aided system 1000 is used to define part geometry, generate manufacturing operations and perform analyses such as finite element analysis (FEA). Lattices can be created within CAD system 1000 and therefore managed like other design geometry. Lattices can be linked to other design features and therefore can be automatically updated if design geometry changes. The approach allows the user to refine and edit the lattice structures after generation as they would any other geometry in their CAD/CAM environment. This approach enables analyzing mass properties of parts with lattices. It enables more straightforward computer-aided engineering analysis, including but not limited to finite element simulations, of parts with lattices within the PLM system. It enables creation of optimized manufacturing instructions of parts with lattices within same PLM system.

Figure 11:
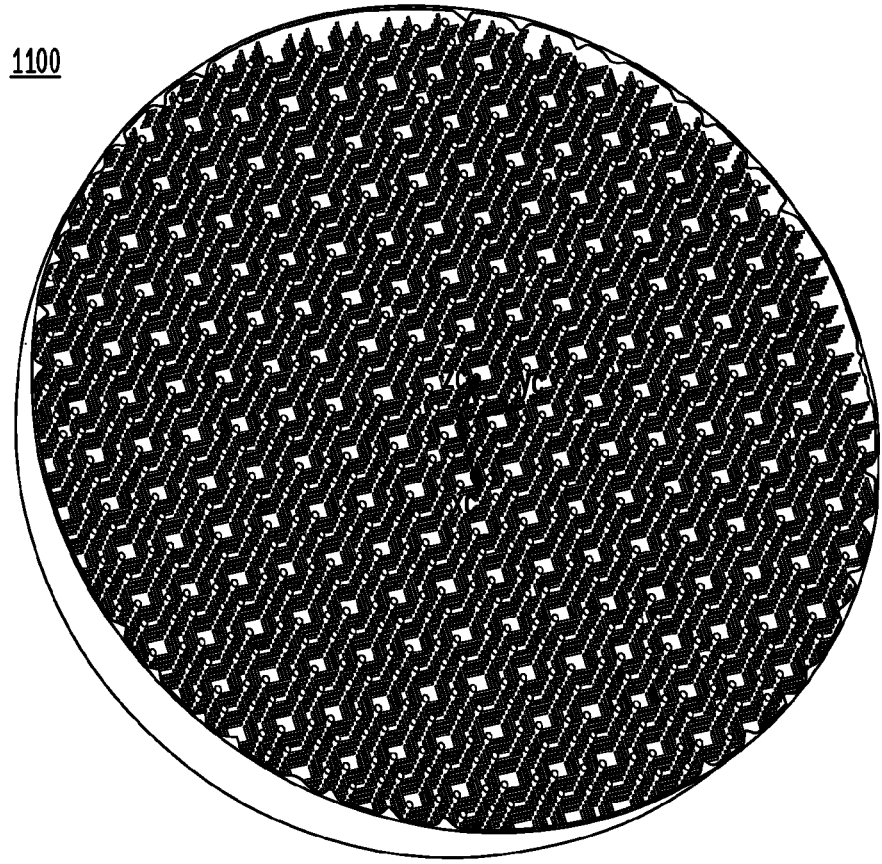
FIGS. 11, 12A and 12B illustrate high resolution lattices can be applied arbitrarily to shapes in accordance with disclosed embodiments.
Figure 12A:
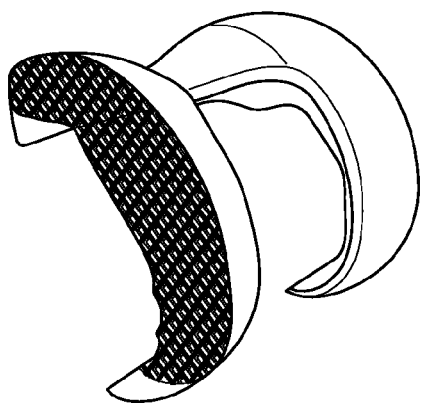
Figure 12B:
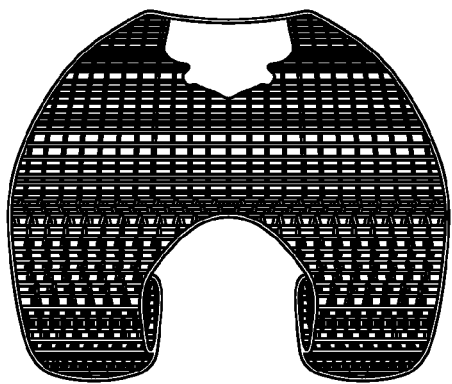

FIGS. 11, 12A and 12B illustrate high resolution lattices can be applied arbitrarily to shapes in accordance with disclosed embodiments. FIG. 11 illustrates a high resolution lattice 1100 created on a CAD part. FIGS. 12A and 12B illustrate a high resolution lattice 1200 created on a polygonal mesh object with uniform hollowing.

Figure 13A:
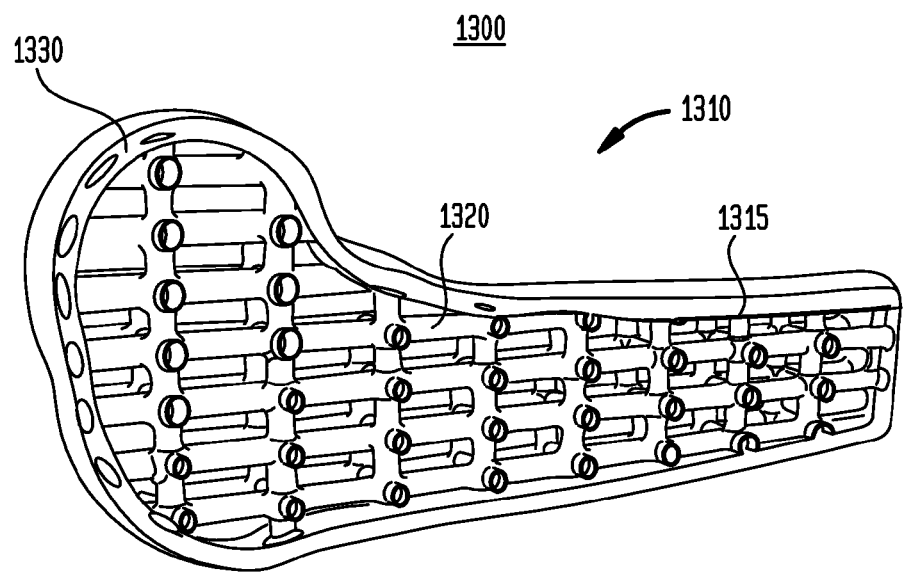
FIG. 13A illustrates a uniform hollowing of an organic shape that has been hollowed out with a uniform thickness and with a lattice applied in accordance with disclosed embodiments.
Figure 13B:
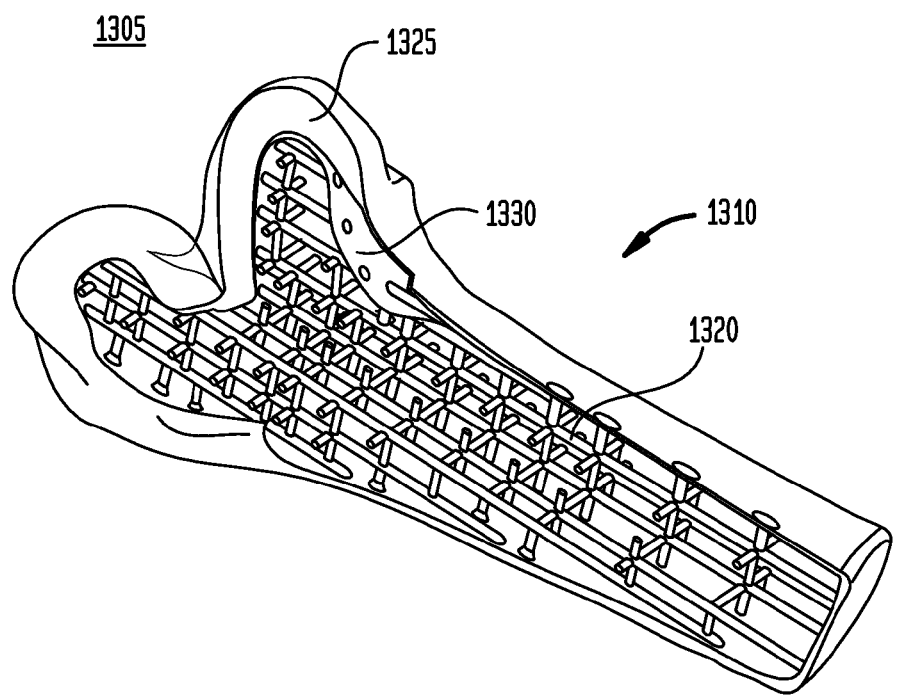
FIG. 13B illustrates non-uniform hollowing of the same organic shape hollowed with variable thickness in accordance with disclosed embodiments.

FIG. 13A illustrates a uniform hollowing 1300 of an organic shape 1310 that has been hollowed out with a uniform thickness 1315 and with a lattice 1320 applied in accordance with disclosed embodiments. FIG. 13B illustrates non-uniform hollowing 1305 of the same organic shape 1310 hollowed with variable thickness 1325 in accordance with disclosed embodiments. The variable thickness 1325 provides that the hollowed surface 1330 is thicker on the left and thinner on the right. As a consequence, the left region of the organic shape 1310 is more solid with less lattice 1320 and vice versa on the other region.

Figure 14:
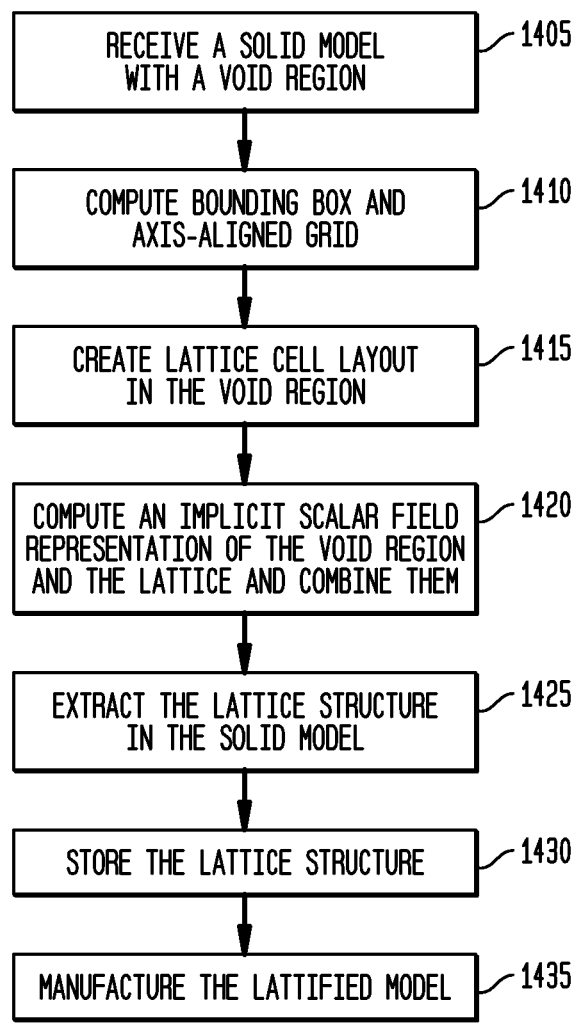
FIG. 14 depicts a flowchart of a process for creating three dimensional lattice structures in computer-aided design models for additive manufacturing in accordance with disclosed embodiments that may be performed, for example, by a PLM or PDM system.

FIG. 14 depicts a flowchart of a process for creating three dimensional lattice structures 1400 in computer-aided design models for additive manufacturing in accordance with disclosed embodiments that may be performed, for example, by a PLM or PDM system.

In step 1405, the system receives a solid model containing a plurality of boundary surfaces 150 for a void region. The system starts with a closed solid model of arbitrary genus and containing a void region, $R_v$, to be lattified. The void region can be specified as either a volume to be hollowed from the solid model, with a constant or varying surface thickness, or as an empty region of the solid model, in which case, the hollowing operation can be skipped. The method is applicable to any geometric representation for a set of boundary surfaces 150, S, of the void region for which point-to-surface distances 160 can be computed and inside-outside queries can be determined. A number of opening bodies, $R_o$, can be specified when the region to be lattified is not fully enclosed, such as illustrated in FIGS. 3A and 3B.

In step 1410, the system computes a bounding box 152 and a plurality of grid points 156 on an axis-aligned grid 154 within a bounding box 152. Let $V=v_i \in R^3$, $i=0 \ldots m$ be a collection of grid points 156 lying on an axis-aligned grid 154 that is a discrete representation of the volume within the bounding box 152 of S.

$$(\phi(x)<0 \Rightarrow x \text{ inside}) \quad (1)$$

$$(\phi(x)=0 \Rightarrow x \text{ on the boundary}) \quad (2)$$

$$(\phi(x)>0 \Rightarrow x \text{ is outside}) \quad (3)$$

Equations 1-3 define an implicit surface, $\phi$, by a set of coefficients defined at each grid point 156 $v_i$. At any point in space within the bounding box 152, $x \in R^3$, $(\phi(x))$ can be computed by interpolating the coefficients of the neighboring grid points. The point x can then be classified to be lying inside (equation 1), on the surface (equation 2), or outside (equation 3) of the region $R_v$.

In step 1415, the system creates a lattice cell layout 158 for a lattice structure within the void region. A lattice cell layout 158, $L=1_j$, $j=0 \ldots n$, covering the void region to be lattified is created. For the rod or beam type lattice, the lattice cell layout 158 can be any type of element, for instance tetrahedra, hexahedra, etc. For the template type lattice, each lattice cell is a hexahedron that is homeomorphic to the lattice cell 166. Any volumetric mesh generation process can be used for grid creation, the simplest being an axis-aligned grid 154 creation. The final object will contain the lattice trimmed away by the boundary surfaces 150 of the void region.

In step 1420, the system computes an implicit model representation of the solid model defined by a scalar value 172 for each of the grid points 156 on the axis-aligned grid 154. The discrete implicit representation spans the bounding box 152 of the void region. If opening bodies are present, the opening regions are also converted to discrete implicit representations. Distance fields are used as implicit surface representations, i.e., the coefficients are signed distances to S or surface distances 160. The distance field is a calculation for model values of the minimum distance 162 from each grid point 156 to one of the boundary surfaces 150.

$$\theta_S(v_i) = \text{sign} * \text{argmin}_S \|v_i - S\| \quad (4)$$

$$v_i \cap R_v = \Phi \Rightarrow \text{sign} = 1 \quad (5)$$

$$v_i \cap R_v = v_i \Rightarrow \text{sign} = -1 \quad (6)$$

Equation 4 defines the isosurface $\theta_{O(L)}(v_i)=0$ of the boundary surfaces 150. While the grid point 156 is part of the void region, the sign is negative as in equation 5. While the grid point 156 is not part of the void region, the sign is positive as in equation 6. As discussed above with equation 2, a negative sign corresponds to grid points 156 that are external to the lattice structure and a positive sign corresponds to grid points 156 that are internal to the lattice structure.

$$\theta_{O(S)}(v_i) = \theta_S(v_i) - t_s \quad (7)$$

Equation 7 is used if hollowing is required, and the surface thickness at the computed closest surface point is subtracted from the surface distance 160 value to calculate the hollowed surface 170. Let s ∈ S be the closest surface point to the grid point 156 and let $t_s$ be the surface thickness specified at the closest surface point, s. The isosurface $\theta_{O(S)}=0$ gives the variable thickness offset to the boundary surfaces 150 as specified by the thickness field. Non-uniform hollowing can be performed using scaled distance fields defined over a volumetric mesh.

A cell template can also be specified to be applied within the lattice. The template shape is defined within a lattice cell 166. An associated thickness defines the surface of a lattice shape within a cell as an offset of the skeleton. The lattice template is applied at each lattice cell after suitable transformation (including perhaps morphing) from the definition within a lattice cell 166.

$$\theta_L(v_i) = \text{argmin}_X \|v_i - X\| \quad (8)$$

In equation 8, at each grid point 156, $v_i$, of the volume, the lattice distance 164 to the closest lattice cell shape is also computed. Where X represents the transformed representation of the lattice cell template into the closest lattice cell 166 $1_j$. For a rod/beam type lattice, the lattice grid edges are themselves used as the cell template and the lattice distances 164 are computed from them. The closest lattice cell 166, $1_j$, to the grid point 156 is first identified. In the instance the grid point 156 lies on an edge or vertex of the closest lattice cell 166, the neighboring lattice cells 168 of the closest lattice cell 166 are also considered. The lattice template is appropriately transformed into the shape of the closest lattice cell 166 and the lattice distance 164 to the transformed representation of the template skeleton is then computed. Cell templates can be extended to evaluate analytic functions. Instead of computing distance fields to cell templates, the analytic functions may be evaluated at corresponding grid points 156 $v_i$ within closest lattice cells $1_j$.

$$\theta_{O(L)}(v_i) = \theta_L(v_i) - t_L \quad (9)$$

In equation 9, the thickness value representing the lattice thickness, $t_L$, is subtracted from the lattice distance 164. The thickness value can also be scaled according to the size of the closest lattice cell 166 $1_j$ relative to a model lattice cell 166. The isosurface $\theta_{O(L)}(v_i)=0$ gives the lattice surface.

$$\theta_F = \min(\theta_{O(S)}, \theta_{O(L)}) \quad (10)$$

In equation 10, a boolean combination of the surface distance 160, $\theta_{O(S)}(v_i)$, and the lattice distance 164, $\theta_{O(L)}(v_i)$, is then set as the scalar value 172 at each corresponding grid point 156. The isosurface $\theta_F=0$ gives the lattice surfaces bounded by the surfaces S or the internal surfaces generated by the variable thickness offset to S. If opening bodies are present, the distance fields are also combined to create the appropriately oriented lattice surface.

In step 1425, the system extracts the lattice structure in the solid model. The internal lattice structure surface can be extracted as a polygonal mesh from the implicit volume representation using an iso-surfacing technique such as marching cubes. The polygonal meshes can be post-processed using Delaunay methods to improve the shape.

In step 1430, the system stores the lattice structure in the solid model based on the implicit final representation. The lattice surface is then combined with the outer surface of the solid model to fabricate the desired model with lattice structures. This step allows only updating the data structure for the solid model and does not require any geometric operations for modifications. The correct orientation of the internal surface is obtained directly by choosing the signs of the distance fields in an appropriate manner and therefore, additional processing is not required. The resulting lattified models are topologically correct with solid and void in appropriate regions. The surfaces are clean, self-intersection free and without non-manifoldness or holes. In step 1435, the system manufactures the resulting lattified models.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC §112(f) unless the exact words "means for" are followed by a participle.

What is claimed is:

1. A method for creating three dimensional lattice structures in computer-aided design models and comprising:
   receiving a solid model containing a plurality of boundary surfaces for a void region;
   computing a bounding box of the solid model and a plurality of grid points on an axis-aligned grid within the bounding box;
   creating a lattice cell layout for a lattice structure within the void region;
   computing an implicit model defined by a scalar value for each of the grid points on the axis-aligned grid, wherein the scalar value for each grid point is determined by:
      calculating a surface distance based on a minimum distance for the grid point to the plurality of boundary surfaces;
      calculating a lattice distance based on the minimum distance for the grid point to the lattice structure; and
      setting the scalar value based on a lesser of the surface distance and the lattice distance;
   extracting the lattice structure in the solid model based on the implicit model; and
   manufacturing the extracted lattice structure.

2. The method of claim 1, wherein calculating the surface distance comprises subtracting a surface thickness from the minimum distance for the grid point to the plurality of boundary surfaces when hollowing is required.

3. The method of claim 1, wherein the surface distance is based on the minimum distance for the grid point to a hollowed surface when a variable thickness is applied to the solid model.

4. The method of claim 1, wherein calculating the lattice distance comprises subtracting a lattice thickness from the minimum distance for the grid point to the lattice cell layout.

5. The method of claim 1, wherein the lattice structure comprises a lattice cell template applied at each lattice cell in the lattice cell layout.

6. The method of claim 5, wherein calculating the lattice distance comprises subtracting a lattice thickness from the minimum distance for the grid point to the lattice cell template.

7. The method of claim 6, wherein lattice distance is compared to the minimum distance for the grid point to a lattice cell template of neighboring lattice cells when the grid point lies on an edge or vertex of the lattice cell.

8. A data processing system comprising:
   a processor; and
   an accessible memory, the data processing system particularly configured to:
   receive a solid model containing a plurality of boundary surfaces for a void region;
   compute a bounding box of the solid model and a plurality of grid points on an axis-aligned grid within the bounding box;
   create a lattice cell layout for a lattice structure within the void region;
   compute an implicit model defined by a scalar value for each of the grid points on the axis-aligned grid, wherein the scalar value for each grid point is determined by:
      calculating a surface distance based on a minimum distance for the grid point to the plurality of boundary surfaces;
      calculating a lattice distance based on the minimum distance for the grid point to the lattice structure; and
      setting the scalar value based on a lesser of the surface distance and the lattice distance;
   extract the lattice structure in the solid model based on the implicit model; and
   manufacture the extracted lattice structure.

9. The data processing system of claim 8, wherein calculating the surface distance comprises subtracting a surface thickness from the minimum distance for the grid point to the plurality of boundary surfaces when hollowing is required.

10. The data processing system of claim 8, wherein the surface distance is based on the minimum distance for the grid point to a hollowed surface when a variable thickness is applied to the solid model.

11. The data processing system of claim 8, wherein calculating the lattice distance comprises subtracting a lattice thickness from the minimum distance for the grid point to the lattice cell layout.

12. The data processing system of claim 8, wherein the lattice structure comprises a lattice cell template applied at each lattice cell in the lattice cell layout.

13. The data processing system of claim 12, wherein calculating the lattice distance comprises subtracting a lattice thickness from the minimum distance for the grid point to the lattice cell template.

14. The data processing system of claim 13, wherein lattice distance is compared to the minimum distance for the grid point to a lattice cell template of neighboring lattice cells when the grid point lies on an edge or vertex of the lattice cell.

15. A non-transitory computer-readable medium encoded with executable instructions that, when executed, cause one or more data processing systems to:
   receive a solid model containing a plurality of boundary surfaces for a void region;
   compute a bounding box of the solid model and a plurality of grid points on an axis-aligned grid within the bounding box;
   create a lattice cell layout for a lattice structure within the void region;
   compute an implicit model defined by a scalar value for each of the grid points on the axis-aligned grid, wherein the scalar value for each grid point is determined by:
      calculating a surface distance based on a minimum distance for the grid point to the plurality of boundary surfaces;
      calculating a lattice distance based on the minimum distance for the grid point to the lattice structure; and
      setting the scalar value based on a lesser of the surface distance and the lattice distance;
   extract the lattice structure in the solid model based on the implicit model; and
   manufacture the extracted lattice structure.

16. The non-transitory computer-readable medium of claim 15, wherein calculating the surface distance comprises subtracting a surface thickness from the minimum distance for the grid point to the plurality of boundary surfaces when hollowing is required.

17. The non-transitory computer-readable medium of claim 15, wherein the surface distance is based on the minimum distance for the grid point to a hollowed surface when a variable thickness is applied to the solid model.

18. The non-transitory computer-readable medium of claim 15, wherein calculating the lattice distance comprises subtracting a lattice thickness from the minimum distance for the grid point to the lattice cell layout.

19. The non-transitory computer-readable medium of claim 15, wherein the lattice structure comprises a lattice cell template applied at each lattice cell in the lattice cell layout.

20. The non-transitory computer-readable medium of claim 19, wherein calculating the lattice distance comprises subtracting a lattice thickness from the minimum distance for the grid point to the lattice cell template.

\* \* \* \* \*